United States Patent [19]

Veldhuis

[11] Patent Number: 5,224,061
[45] Date of Patent: Jun. 29, 1993

[54] METHOD OF AND ARRANGEMENT FOR RESTORING INVALID SAMPLES OF AN EQUIDISTANTLY SAMPLED SIGNAL

[75] Inventor: Raymond N. J. Veldhuis, Eindhoven, Netherlands

[73] Assignee: U.S. Philips Corporation, New York, N.Y.

[21] Appl. No.: 531,697

[22] Filed: Jan. 24, 1989

Related U.S. Application Data

[63] Continuation of Ser. No. 898,460, Aug. 20, 1986, abandoned.

[30] Foreign Application Priority Data

Apr. 14, 1986 [NL] Netherlands ............... 8600931

[51] Int. Cl.$^5$ ............................................. G06F 15/31
[52] U.S. Cl. .............................................. 364/724.01
[58] Field of Search ................................. 364/724.01

[56] References Cited

U.S. PATENT DOCUMENTS 4,497,055 1/1985 Hoshino et al. .................. 371/31
4,839,843 6/1989 Veldhuis .......................... 364/724.11

OTHER PUBLICATIONS

J. H. Wilkinson, "Error Analysis of Direct Methods of Matrix Inversion", National Physical Laboratory, Teddington, England, Mar. 1961, pp. 281-330.

H. Hoeve et al., "Error Correction and Concealment in the Compact Disc System", Phillips Tech. Rev. 40, No. 6, 1982 pp. 166-172.

Kailath et al., "An Innovations Approach to Least-Squares Estimation-Part V: Innovations Representations and Recursive Estimation in Colored Noise", *IEEE Trans. on Automatic Control*, vol. AC-18, No. 5, Oct. 1973, pp. 435-453.

Gevers et al., "An Innovations Approach to Least-Squares Estimation-Part VI: Discrete-Time Innovations Representations and Recursive Estimation", *IEEE Trans. on Automatic Control*, vol. AC-18, No. 6, Dec. 1973, pp. 588-600.

Aasnaes et al., "An Innovations Approach to Least-Squares Estimation-Part VII: Some Applications of Vector Autoregressive Moving Average Models", *IEEE Trans. on Automatic Control*, vol. AC-18, No. 6, Dec. 1973, pp. 601-607.

Toyoda et al., "An Application of State Estimation to Short-Term Load Forecasting, Part I: Forecasting Modeling", *IEEE Trans. on Power Apparatus and Systems*, vol. PAS-89, No. 7, Sep./Oct. 1970, pp. 1678-1682.

Tretter, "Linear Parameter Estimation", pp. 355-369, 1980.

*Primary Examiner*—Long T. Nguyen
*Attorney, Agent, or Firm*—Leroy Eason

[57] ABSTRACT

A method and apparatus for replacing invalid samples of an equidistantly sampled signal with corrected samples derived from an environment of valid samples preceding and following the invalid samples. The values of the corrected samples are estimated by first determining a quantity q representing a number of samples corresponding to the periodicity of a segment of the signal over an interval including valid samples and the invalid samples. Such quantity q is utilized in a system of autoregression equations in which the corrected sample values are unknown quantities, and such equations are solved by a microprocessor to derive estimates of such sample values on a "real time" basis. The method can be applied to achieve restoration of a speech signal in which there may be intervals of up to approximately 12 msec containing invalid samples.

6 Claims, 2 Drawing Sheets

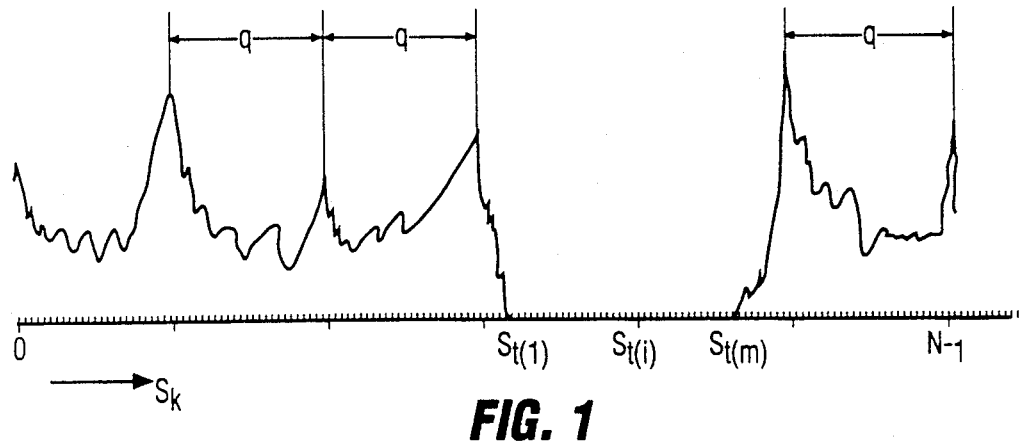
FIG. 1
FIG. 2
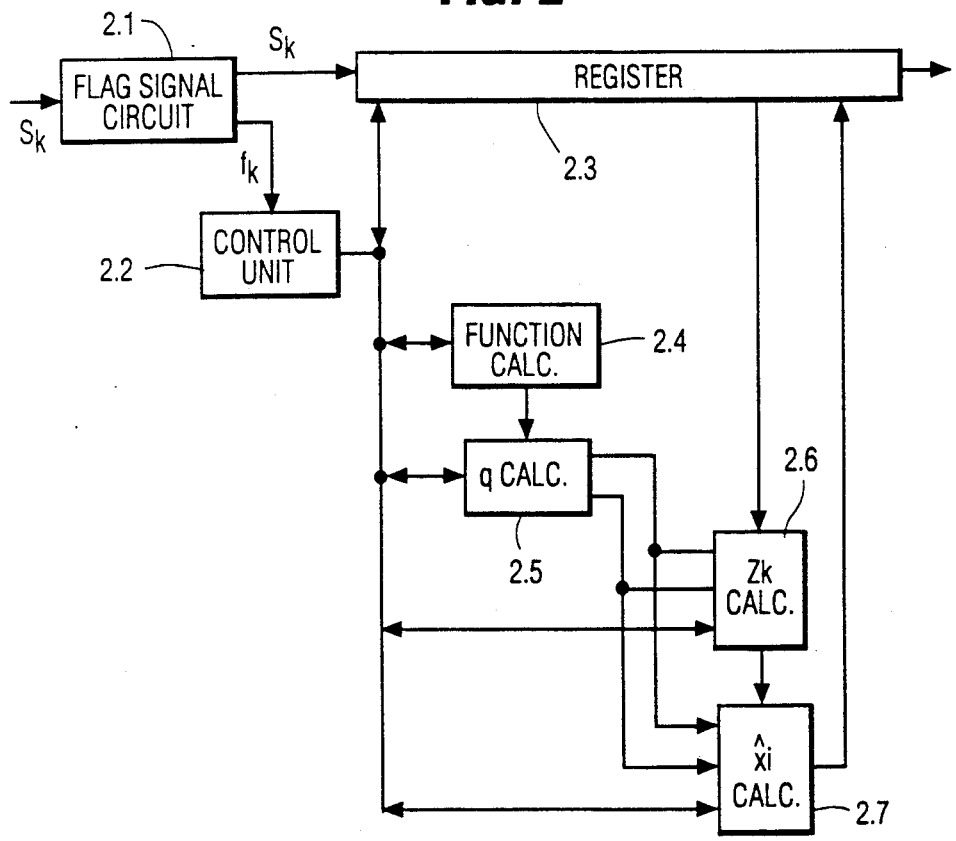

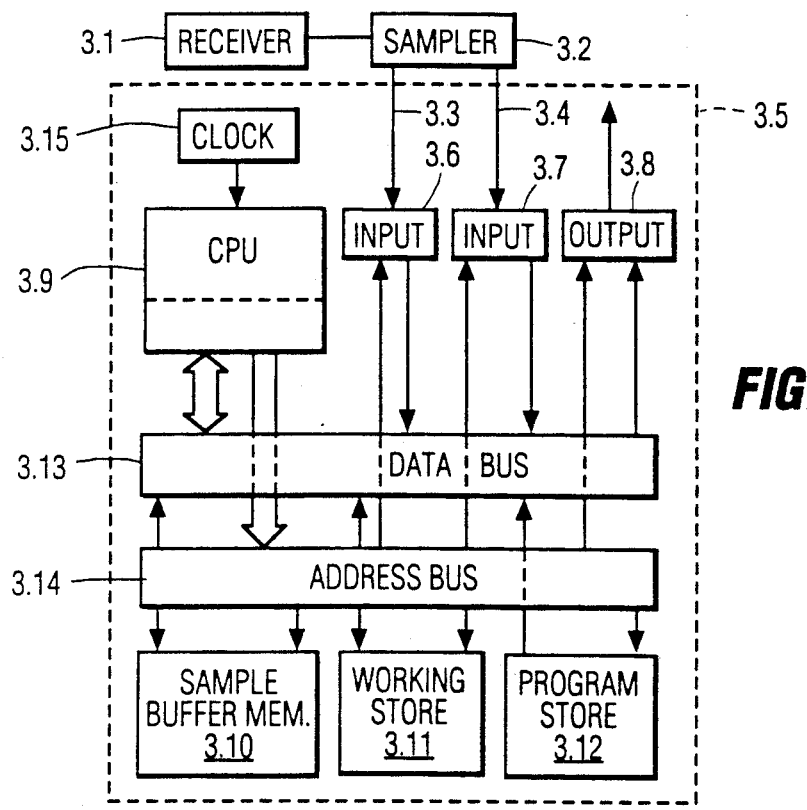
*FIG. 3*
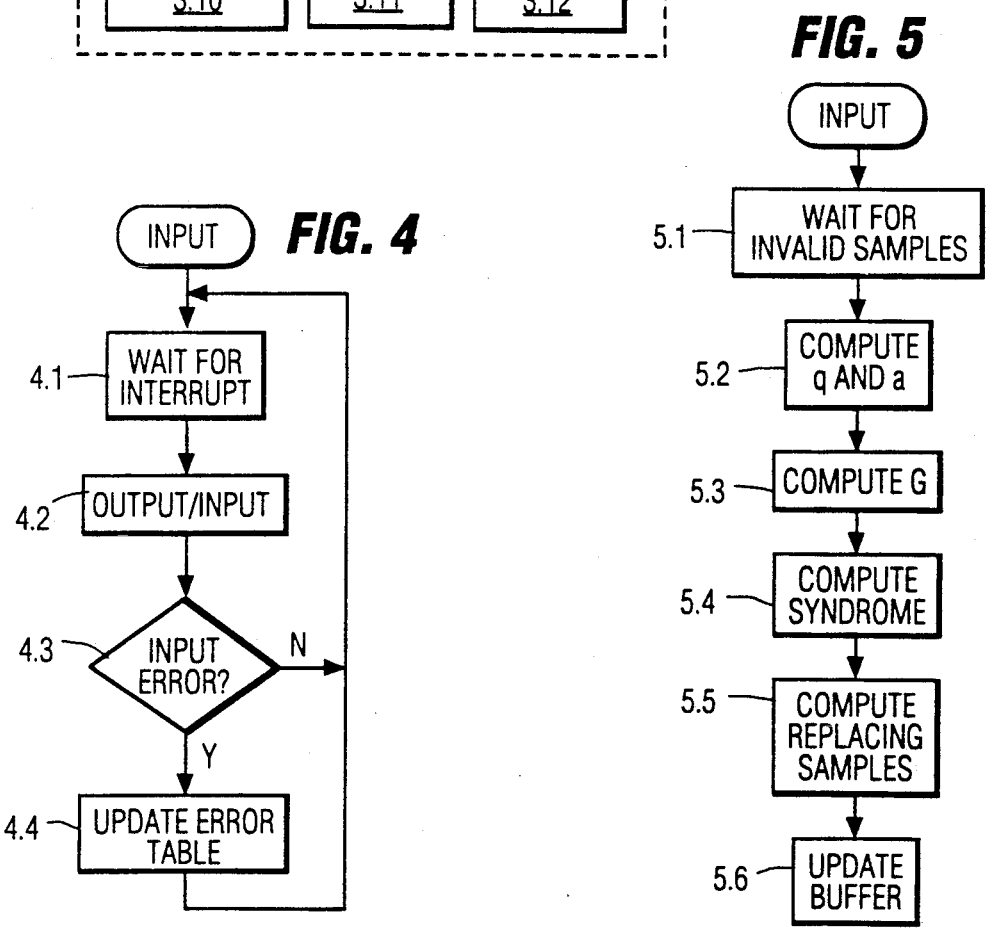

METHOD OF AND ARRANGEMENT FOR RESTORING INVALID SAMPLES OF AN EQUIDISTANTLY SAMPLED SIGNAL

This is a continuation of application Ser. No. 898,460, filed Aug. 20, 1985, now abandoned.

BACKGROUND OF THE INVENTION

1. Field of the Invention

The invention relates to a method of and apparatus for restoring unknown samples of an equidistantly sampled signal, which samples are considered to be invalid, on the basis of replacement values derived from an environment of samples which are considered to be valid and occur previous to and subsequent to an interval containing the samples to be restored.

2. Description of the Related Art

Such a method and arrangement are disclosed in Netherlands patent application 8,304,241, which corresponds to pending U.S. application Ser. No. 07/442,495, filed Nov. 27, 1989, now U.S. Pat. No. 5,025,404, assigned to the present assignee, of which applicant herein is a named co-inventor.

According to these prior art arrangements, which employ higher order autoregressive procedure, the value of a sample to be restored is estimated from a linear combination of a number of known samples described by this order. The order of the recursion procedure is determined in dependence on the number of samples to be restored. This means that a number of prediction coefficients depending on the type of signal to be restored must be calculated before a most appropriate recursion formula can be drawn up for each samples. From the recursion equations thus determined, a system of equations is formed in which the estimated values (estimators) of the samples to be restored are present as unknown factors.

Although the prior art arrangements are suitable for recovering audio signals, such as music or speech, the bulk and complexity of the computational operations to be performed are such that it becomes problematical to satisfy with an economically justifiable structure the requirements imposed on performance properties of specific systems. More specifically, these prior art techniques are less suitable for recovering signals in which comparatively long intervals, having an order of magnitude of, for example, 10 msec, and containing samples which must be considered as invalid, occur.

SUMMARY OF THE INVENTION

Generally, the invention has for its object to provide an alternative and simplified technique for the above-described technique of interpolating time-discrete signals which can be modelled as higher-order autoregressive procedures.

The object is, more specifically, to make available an interpolation technique which efficiently eliminates interference effects having the character of what is commonly referred to as selective fading. Mobile telephony systems, for example of the type usually denoted as MATS (Mobile Automatic Telephony Systems) are illustrative of transmission systems in which such interference effects may occur.

At the receiver end of such a transmission system, it is customary for a signal to be supplied there in the form of an equidistantly sampled signal. Because of selective fading the received signal which, as a rule is a speech signal modulated on a carrier, drops out regularly and during certain intervals. Consequently the values of a number of samples are unknown. In order to avoid or reduce observable interference effects in the ultimately obtained signal, it must be possible to restore the values of the unknown samples, which are considered invalid, on a real-time basis.

The invention is based on the recognition that for a signal having periodicity, a prediction procedure can be used which is significantly simplified compared with prior art prediction procedures, whereby a sample recovery system can be realised which satisfies specific requirements as to performance and cost.

According to the invention, a method of the type defined in the opening paragraph is characterized in that a sequence of consecutive samples $s_m$, where $k=0, 1, \ldots, N-1$, and comprising a set of samples to be corrected is corrected on the basis of an anticipated periodicity of the signal segment corresponding to this sequence of samples $s_k$. On the basis of this sequence of samples $s_k$ a quantity q, which represents a number of samples, is determined which is a measure of the periodicity of the signal segment. For a sub-sequence of consecutive samples $s_{t(i)}$, wherein $i=1, \ldots, m$, and which are considered invalid, a m-vector z is determined from the samples $s_{t(i)-nq}$ and $s_{t(i)+nq}$, wherein $ws_{(i)-nq}$ and $s_{t(i)+nq}$, respectively represent a sample which is located in a position of nq samples before and after, respectively, the $i^{th}$ sample $s_{t(i)}$, wherein n is an integer. Such samples are added together pairwise after scaling. A system of equations with a number m of unknowns, is established of the form $G\hat{x}=z$, wherein G is a m×m matrix given by $$G_{kl} = \begin{cases} 1, & k=l & k,l=1,\ldots,m \\ a, & |t(k)-t(l)|=q & k,l=1,\ldots,m \\ C, & \text{elsewhere} & k,l=1,\ldots,m \end{cases}$$

and wherein t(k) and t(l), respectively, represent the positions of the respective $k^{th}$ and $l^{th}$ invalid sample in the sequence $1, \ldots, m$; "a" represents a constant $-\frac{1}{2} < a < 0$ to be selected; and $\hat{x}$ is an m vector having the elements $\hat{x}_i$, wherein $\hat{x}_i$ is an estimator for an invalid sample in the position t(i), and $i=1,\ldots,m$ and from the system $G\hat{x}=z$ the m-values for $\hat{x}_i$ are solved in a manner known per se.

The invention can be used advantageously to restore a digitised speech signal of which a number of sample values are unknown because of interference. According to the invention, a method of restoring samples which form part of a substantially periodical signal sampled at a rate $f_s$, is characterized in that for the number N of the samples $s_k$, wherein $k=0, \ldots, N-1$, such a value is chosen that $N=2 f_s/f_{min}+m$, wherein $f_{min}$ represents the frequency which corresponds to the maximum anticipated periodicity of the signal segments to be restored and m represents the number of samples to be restored, contained therein.

In order to achieve optimum results, a method according to the invention is further characterized in that the sub-sequence of invalid samples $s_{t(i)}$ relative to the sequence of N samples $s_k$ is chosen such that it holds that $$q_{max} \leq t(i) \leq N-1-q_{max},$$

wherein $q_{max}$ is a quantity represented by a number of samples and is a measure of the maximum anticipated periodicity of the signal segment represented by this sequence and t(i) represents the position of the $i^{th}$ sample in said sub-sequence. This accomplishes that an interval comprising a set of samples to be restored is limited at the front and at the rear by an optimum appropriate environment of samples which can be considered as valid.

In some cases the matrix G, with the aid of which the system of equations having the estimators $\hat{x}_i$ for the samples $s_{t(i)}$ to be restored is described, is a Toeplitz matrix whose three diagonals comprise coefficients having a value other than zero. It then is advantageous to use a LU decomposition which is known per se for solving for the unknowns. According to the invention the method is then characterized in that it is ascertained whether the number of m invalid samples is greater or less than the quantity q+1. If $m \leq q$, $\hat{x}$ is chosen equal to z, and if $m \geq q+1$, the matrix G is converted by means of LU decomposition into the product LU, wherein L and U respectively represents a lower triangular matrix and an upper triangular matrix, respectively, of m×m elements, the matrix elements $L_{kk}$ and $U_{kk}$, respectively being equal to 1, wherein k=1, ..., m. It holds for the elements $U_{kk}$, $L_{k, k-1}$ and $U_{k,k+q}$, differing from zero, that:

$$U_{kk} = 1 + c^2, \qquad k = 1, \ldots, q$$
$$U_{kk} = 1 + c^2 - c^2/U_{k-q,k-q} \quad k = q + 1, \ldots, m$$
$$U_{k,k+q} = -c, \qquad k = 1, \ldots, m - q$$
$$L_{kk} = 1 \qquad k = 1, \ldots, q$$
$$L_{k,k-q} = -c/U_{k-q,k-q} \qquad k = q + 1, \ldots, m$$

wherein C is a periodicity coefficient. These are solved from the system Ly=z, y in accordance with $$Y_k = \begin{cases} z_k, & k = 1, \ldots, q \\ z_k - L_{k,k-q} y_{k-q} & k = q + 1, \ldots, q \end{cases}$$

and solved from the system $U\hat{x} = y$, $\hat{x}$ in accordance with $$\hat{x}_{m+1-k} =$$
$$\begin{cases} y_{m+1-k}/U_{m+1-k,m+1-k} & k = 1, \ldots, q \\ (y_{m+1-k} - U_{m+1-k,m+1-k+q}^k = q + 1, \ldots, m \\ \hat{x}_m + 1 - k + q) + \\ (U_{m+1-k,m+1-k}) \end{cases}$$

A sample value correction apparatus of the type described in the above-identified Netherlands patent application generally includes detection means for designating samples eligible for restoration, and memory means for storing a sequence of consecutive samples which comprise a set of samples to be restored. Based on an arrangement of the said described type, apparatus for performing the method according to the invention is characterized by computing means programmed for;

(a) determining said quantity q starting from a set of samples which were detected as being valid and were stored in the memory means;

(b) determining for samples in positions located at a distance of n.q samples before and after a sample in a position i, $s_{t(i)}$, the elements of the m-vector z and also for scaling these element values with the absolute value of said quantity a; and (c) calculating, in response to the inputting of output signals effected by the first and second arithmetic means, a number of m sampling substitution values as estimators for the samples to be recovered.

An embodiment which as regards components and operating rates is an advantageous embodiment of apparatus for performing a method according to the invention, is further characterized by a comparator for comparing the numerical values of the quantity m which represents the number of samples to be recovered and the numerical value of said quantity q, a command signal being produced when $m \geq q+1$;

the third arithmetic means are arranged for converting, in response to the above-mentioned ;command signals, the matrix G by LU decomposition into the product LU, wherein L and U, respectively, represents a lower triangular matrix and an upper triangular matrix, respectively, of m×m elements, whose elements $L_{kk}$ and $U_{kk}$, respectively, are equal to 1, wherein k=1, ..., m, and it holding for the elements $U_{kk}$, $L_{k, k-1}$ and $U_{k,k+1}$ differing from the value 0, that $$U_{kk} = 1 + c^2, \qquad k = 1, \ldots, q$$
$$U_{kk} = 1 + c^2 - c^2/U_{k-q,k-q} \quad k = q + 1, \ldots, m$$
$$U_{k,k+q} = -c, \qquad k = 1, \ldots, m - q$$
$$L_{kk} = 1 \qquad k = 1, \ldots, q$$
$$L_{k,k-q} = -c/U_{k-q,k-q} \qquad k = q + 1, \ldots, m$$

which is solved from the system $U\hat{x}=y$, $\hat{x}$ in accordance with $$Y_k = \begin{cases} z_k, & k = 1, \ldots, q \\ z_k - L_{k,k-q} y_{k-q} & k = q + , \ldots, q \end{cases}$$

which is solved from the system $U^t \quad -y$, in accordance with $$\hat{x}_{m+1-k} =$$
$$\begin{cases} y_{m+1-k}/U_{m+1-k,m+1-k} & k = 1, \ldots, q \\ (y_{m+1-k} - U_{m+1-k,m+1-k+q}^k = q + 1, \ldots, m \\ \hat{x}_m + 1 - k + q) + \\ (U_{m+1-k,m+1-k}) \end{cases}$$

and that, when the command signal is not forthcoming, so for $m \leq q$, the third arithmetic means make $\hat{x}$ equal to z.

Based on the consideration that the matrix elements $U_{kk}$ and $L_{k,k-q}$ of the auxiliary matrices obtained by the LU decomposition appear to be constant through intervals of q consecutive values for the index k, an arrangement for using a method according to the invention is further characterized by a Table memory for storing predetermined values of elements of the L matrix and the U matrix of the product LU.

The invention can be used advantageously in systems in which relatively long intervals up to approximately 12.5 msec., with invalid samples, occur in an applied signal.

Relevant Literature (1) Pitch detection/determination of the periodicity coefficient c: L. R. Ragine, R. W. Schafer, Digital Processing of Speech signals, Prentice Hall, 1978.

(2) LU decomposition / solving the system $G\hat{x}=z$: J. H. Wilkinson, Error analysis of direct method of matrix inversion J. Assoc. Comp. Mach. 8, 281-330.

BRIEF DESCRIPTION OF THE DRAWINGS

The invention and how it can be put into effect will now be described in greater detail by way of example with reference to the accompanying drawing, in which:

FIG. 1 is a waveform diagram of an equidistantly sampled periodical signal, a portion of which contains unknown samples and with the aid of which the method according to the invention will be explained;

FIG. 2 is a block diagram to illustrate the basic operations performed in carrying out a method according to the invention;

FIG. 3 is a block circuit diagram to illustrate an embodiment of an arrangement for performing the method according to the invention;

FIG. 4 is a flow chart illustrating the input/output program executed in the embodiment of FIG. 3; and FIG. 5 is an illustration of the restoration program executed within the scope of the invention.

DETAILED DESCRIPTION OF THE PREFERRED EMBODIMENTS

FIG. 1 shows schematically an equidistantly sampled speech signal defined as a sequence of consecutive samples $s_k$, wherein $k=0, 1, \ldots, N-1$. An interval of this signal contains a sequence of samples $s_{t(i)}$, wherein $i=1, \ldots, m$, which are unknown and considered as invalid. In accordance with the strategy on which the present invention is based, it is attempted to substitute estimated values $\hat{x}_i$ for the unknown samples $s_{t(i)}$ such that the reconstructed portion of the signal will be matched as well as possible to the periodicity of the environment of samples preceding and subsequent to the interval containing unknown samples.

Unknown samples in a time discrete signal can generally be estimated when the signal frequency spectrum $S(\theta)$ is known. $-\pi \leq \theta \leq \pi$, wherein $\theta$ is the normalised frequency of the signal and is known. The vector x of the actual values of the unknown samples is defined as $$x_i = s_{t(i)}, \text{ wherein } i=1, \ldots, m.$$

The vector $\hat{x}$ of the estimated values of the unknown samples is defined by $$x_i = s_{t(i)}, \text{ wherein } i=1, \ldots, m,$$

wherein $\hat{s}_{t(i)}$ is an estimation of the actual value of the unknown samples $s_{t(i)}$. Furthermore, the row $(g_k)$ is defined by $$g_k = \frac{1}{2\pi} \int_{-\pi}^{\pi} \frac{1}{S(\theta)} e^{j\theta k} \cdot d\theta, \quad (1)$$

wherein $k = -\infty, \ldots, \infty$

Then the what is commonly referred to as the syndrome vector z is defined by $$z_k = -\sum_{l=-\infty}^{+\infty} g_{(t(k)-l)} \cdot s_l, \quad (2)$$

wherein $k = 1, \ldots, m$ wherein $l \neq t(1), \ldots, t(m)$

At the same time the $m \times m$ matrix G is defined by (3) $G_{kl} = g_{g(k)-g(l)}$, wherein $k,l = 1, \ldots, m$ The vector $\hat{x}$ of the estimated values of the unknown samples is the solution of the system $G\hat{x}=z$.

An interpolation technique for autoregressive procedures as described in above-identified Netherlands and corresponding pending U.S. patent application, now follows from the equations given hereinbefore, by substituting for $S\theta$ in the equation given for $g_k$ the expression for the spectrum of an autoregressive procedure. Then the expression $$g_k = \begin{cases} 0, & |k| > p \\ p - |k| \\ \Sigma a_1 a_1 + |k|, & |k| \leq p \\ 1 = 0 \end{cases} \quad (4)$$

is obtained for $g_k$, wherein p represents the order of the auto-regressive procedure and $a_0, \ldots, a_p$ represents the prediction coefficients.

Within the scope of the present invention a periodicity q in the signal is utilized. This results for the expression $g_k$ in the following $$g_k = \begin{cases} 1, & k = 0 \\ a = -\dfrac{c}{1 + c^2}, & k = p = q \\ 0, & k \neq 0, k \neq q \end{cases} \quad (5)$$

wherein c is a periodicity coefficient known from the relevant literature and a is a scaling constant determined thereby.

From this expression (6) $Z_k = -a(s_{t(k)-a} + s_{t(k)-q})$, $k=1, \ldots, m$ follows for the above-mentioned syndrome vector z and for the matrix G $$G_{kl} = \begin{cases} 1, k = 1 & k,l = 1, \ldots, m \\ a, |t(k) - t(l)| = q & k,l = 1, \ldots, m \\ 0, \text{elsewhere} & k,l = 1, \ldots, m \end{cases} \quad (7)$$

As only the periodicity q of the signal is used, the complexity of the system of operations necessary to determine the estimated values of the unknown samples is significantly simplified. In addition to the fact that no prediction coefficients need to be calculated anymore, the row $g_k$ is simplified to the a row wherein $k = -q, \ldots, q$, of which only the elements $g_{-q}$, $t_O$ and $g_q$ have a value differing from zero.

At the same time it was found that for the constant periodicity coefficient c, which is decisive for the scaling factor a, a value of 0.5 and 1.0 can be chosen for the restoration of speech sampled.

The matrix defined by formula (3) is, when a consecutive sequence of samples to be restored is processed, a Toeplitz matrix so that the system $G\hat{x}=z$ can be solved in a simple way, for example by means of the Levinson algorithm which is known per se.

It has namely found to be acceptable to assume that the samples to be restored only occur as sequences of consecutive items. The restoration result is not significantly poorer when it is also assumed that non-contiguous patterns of invalid samples are considered as a contiguous sequence.

The quantity q which is a measure, represented by numbers of samples, of the periodicity of the signal segment constituting the environment preceding and subsequent to a time interval with unknown samples which are considered invalid can be determined in accordance with a technique which is known per se, for example a technique described in literature reference 1.

The block diagram shown in FIG. 2 is representative of the set of basic functions which are to be performed to achieve that unknown samples, which are considered invalid, are replaced by estimated samples such that the signal segments reconstructed thereby fills the gap in the periodicity of the received signals to the best possible extent. It is essential to the invention that a considered sequence of N samples $s_k$, wherein $K = 0, \ldots, N-1$, which contains a sub-sequence of unknown samples, contains at least a sufficient number of valid samples so that the periodicity of the signal segment represented by this sequence can be derived therefrom. In other words, in the first instance a sequence of consecutive samples $s_k$, containing a set of samples to be restored, must be collected on the basis of an anticipated periodicity of the signal segments represented by this sequence of samples $s_k$. Each signal sample $s_k$ is supplied in combination with a flag bit which indicates whether the relevant sample must be considered as being valid or not valid. A flag signal $f_k$ which is applied to a control unit 2.2 is derived from an applied sequence of signal samples $s_k$ by means of a flag bit recognition circuit 2.1. At the same time the applied signal samples are entered from the flag bit recognizing arrangement into a freely accessible register 2.3.

In response to the applied flag signal $f_k$ the control until 2.2 inter alia operative to so control the acquisition of signal samples $s_k$ that in the register 2.3 a number of N samples $s_k$ is collected at a given instant, including a pre-environment of valid samples, a gap having a number m of samples which must be considered as being invalid and a post-environment of valid samples. Preferably, all this is arranged such that the pre-environment and post-environment each contain the same number of valid samples, which number is chosen on the basis of anticipated periodicity of the applied signals. When a speech signal is involved which, as is customary, is sampled at a frequency of 8000 Hz, resulting in 8 samples per msec, this choice is based on an anticipated periodicity of not more than approximately 20 msec. This implies a pre-environment and a post-environment, respectively of at least 160 valid samples. It will be obvious that the time during which such a set of N signal samples remains stored in the register must be such that the estimators which are to be substituted for the samples which are considered invalid, can be determined. After such a set formed from a number N of consecutive samples $s_k$ has been produced in the above-described manner in the register 2.3, the above described quantity q must be determined which, expressed as a number of samples, is a measure of the periodicity of the signal segments represented by the samples stored in the register. For the sake of completeness, it should be noted that the total number of samples stored temporarily in the register for a restoration procedure, is always less than a number of samples corresponding to a time interval in which the relevant signal segment may be considered as being stationary.

For speech it has been found that the periodicity to be anticipated has a value in a range limited by 2 and 20 msec. For a speech signal sampled at a frequency of 8000 Hz, this means that the q values can be located in a range limited by the values 16 and 160 for the number of samples.

The blocks denoted in FIG. 2 by 2.4 and 2.5 are digital computing means for performing the above-described function, i.e., the determination of the value q. To determine or estimate this periodicity, use can be made of a technique which is known per se. A technique is, for example, used in which the autocorrelation function of the relevant signal is estimated. Since, as described in the foregoing with reference to formula (5), use is made of a constant periodicity coefficient c, the procedure in which the above-mentioned value q is estimated need only to satisfy the requirement that the estimated auto-correlation function $r_k$ considered over an interval of q-values from $q_{min}$ to $q_{max}$, wherein $q_{min}$ and $q_{max}$, respectively, are the q values corresponding to the minimum and maximum anticipated periodicity, reaches it global maximum at $k = q$. The digital computing means in block 2.4 estimates the auto-correlation function of the signal segment stored in the register. To that end pre-environment samples and post-environment samples, relative to the sequence of samples to be restored $s_{f(l)}$, wherein $l = 1, \ldots, m$, are read from the register 2.3 under the control of the control unit 2.2 and are entered into the function computing means in block 2.4. In this situation the number of environment samples n is given by the maximum periodicity to be anticipated of the relevant signal segment. As has been described in detail in the foregoing, for speech sampled at a frequency of 8000 Hz, this number is 160.

The auto-correlation function $r_k$ can be estimated by $$r_k = \frac{1}{N} \sum_{l=0}^{N-k} s_l s_{l+k}, \quad k = 0, \ldots, 160 \tag{8}$$

Herein it is assumed that it relates to a speech signal. N represents the total number of samples $s_k$ stored in the register 2.3. The value O is substituted for the values $s_{f(l)}, \ldots, s_{f(m)}$. The q-value searched for is that corresponding to a value of k for which $r_k$, where $k = 16, \ldots, 160$, is at its maximum.

In this connection it should be noted that within the scope of the present invention no difference is made during the restoration of applied speech signals between voice speech and unvoiced speech. The block denoted in FIG. 2 by 2.5 represents digital computing means for deriving from the auto-correlation function determined by block 2.4 the position expressed as the value of index k of the global maximum of the function $r_k$ which is searched for. The k-value thus found then represents the quantity q searched for. At the same time the function computing block 2.5 supplies, each time a component $z_k$ of the syndrome factor z must be calculated, the scaling factor a required therefor. As will be apparent from formula (5), this scaling factor is a constant determined by the chosen periodicity constant c. The block 2.6 in FIG. 2 is digital computing means which performs the function in which, in accordance with formula (6), the components $z_k$ are determined. Under the control of the control unit 2.2 an environment determined by the found value q of the samples $s_{g(i)}$ to be recovered is read from the register 2.3 and entered into the function block 2.6. It determines the components $z_k$, wherein $k=1, \ldots, m$, in accordance with formula (6) by adding together the relevant samples pair-wise after scaling with the constant $-a$. In principle it is possible to determine these components $z_k$ using an integral multiple of the determined value q.

Under the control of the central control unit 2.2 the m-vector z determined by block 2.6 is entered, in combination with the quantities q and a, into digital computing means denoted by the block 2.7, which functions to establish a set of am equations with the data q, a and z entered therein, using $G_{kl}$ in accordance with formula (7), the m unknown estimators $\hat{x}_i$ and the syndrome vector z in accordance with the formula (6) and scaled with the constant $-a$, and to calculate the estimated samples $\hat{x}_i$ from the set of equations thus formed. Under the control of the central control unit 2.2 the estimated samples $x_i$ generated by the block 2.7 are substituted for the samples $s_{r(i)}$ to be restored which were stored in the first instance in the register 2.3. Subsequently, the signal segment $S_{k-D}$ thus restored is read from the register 2.3 under the control of the control unit 2.2 so as to prepare the system for a subsequent restoration procedure.

The restored signal segment is read from the register after a fixed delay D after is was entered into the register, wherein D is the period of time in which the complete restoration procedure of the entered samples can be finished. The invention offers the possibility to restore within the limitations imposed by the time interval D, comparatively long sequences of invalid samples. This means that in systems in which selective fading phenomenon must be taken into account, interference intervals up to approximately 12 msec can be restored.

FIG. 3 shows a block circuit diagram of an embodiment of apparatus for performing the method according to the invention. Such apparatus closely resembles that in FIG. 3 of the above-mentioned copending U.S. application Ser. No. 07/442,495, but the central processing unit 3.9 herein is programmed to provide an entirely different mode of operation of the apparatus. The block 3.1 is a receiver which is of common usage in a MAT system for receiving a speech signal modulated on a carrier of, for example approximately 300 MHz. The output signal of this receiver is applied to a signal demodulating and sampling circuit 3.2 which includes an error bit recognizing arrangement forming part thereof. This signal processing unit is arranged for supplying at its output words containing 3.3 m bits and which are each representative of a sample of the speech signal received by the receiver. A sampling frequency customary for speech is a frequency of 8000 Hz so that the speech samples appear at the output 3.3 at 125 microsecond intervals. For each of the speech samples available at the output 3.3 a flag bit indicating whether the relevant sample must be considered to be valid or invalid is also supplied from the output 3.4. The speech samples and the flag bit signals are applied to relevant input arrangements 3.6 and 3.7 of a microprocessor configuration denoted by 3.5 which calculates estimated values for sequences of invalid samples and includes an output arrangement 3.8 for outputting th estimated values of the samples. The microprocessor has a central processing unit 3.9 including a control section, a computational section and a logic section, and also three memories 3.10, 3.11 and 3.12. The memories 3.10 and 3.11 are random access memories, the memory 3.10 operating as a cyclic input buffer memory and the memory 3.11 operating as a working store for storing intermediate results. The memory 3.12 is a static memory in which the relevant programs which are to be executed for effecting a restoration procedure are stored. The memories 3.10, 3.11 and 3.12 are coupled to the central processing unit 3.9 via a data bus line 3.13, through which 2-way data traffic can be passed to and from the processing unit 3.9. For conveying addresses, the memories 3.10, 3.11 and 3.12 and also the input and output arrangements 3.6, 3.7 and 3.8 are coupled to the central processing unit 3.9 via an address bus line 3.14. At the same time a clock 3.15 determines the time regime under which the central processing unit performs its functions, including inputting and outputting of data. Inputting and outputting data is effected under the control of a program stored in the program store 3.12. This program store 3.12 also contains the programs which are to be executed for performing the functions described above with reference to FIG. 2. The memory 3.10 then functions as the register denoted by 2.3 in FIG. 2, whilst the working store 3.11 contains inter alia a Table of addresses of the samples to be restored.

To simplify the complex of operations to be performed, the static memory 3.12 contains a program by which 3.9 determines the value of q in a known manner and z and factor a are determined in the manner described above. If it is found that m is less than or equal to q, then $\hat{x}$ is chosen equal to z. If it is found that the number m of samples to be restored exceeds q, a LU decomposition is started for solving the matrix $G_{kl}$. This simplifies the functions to be performed by the estimated sample calculation processing block 2.7 of FIG. 2. As is generally known, a matrix G can be converted to a product in accordance with $G=LU$, when L represents a m×m matrix containing a lower triangle of which $L_{kk}=1$ with $k=1, \ldots, m$ and $L_{kL}=0$ for $m \geq 1 \leq k \geq 1$, and U represents a m×m matrix containing an upper triangle, for which $U_{kl}=0$, for $m \geq k > 1 \geq 1$, when $k=1, \ldots, m$.

The program is aimed at determining the m invalid sample estimated values $\hat{x}_i$ as components of the m-vector $\hat{x}$ from the system of equations of the form $G\hat{x}=z$, wherein G is given by $G_{kl}$ in accordance with formula (7) and the components $z_k$ of the m-vector z are given by $z_k$ in accordance with formula (6) by first solving y from the system $Ly=z$ and thereafter solving $\hat{x}$ from the system $Ux=y$, as is known from, for example, Reference 2. A further procedure according to the invention is as follows.

It is first ascertained whether the number m of samples to be restored exceeds q, wherein q is the quantity representing a number of samples and corresponds to the periodicity of the signal segment defined by the samples $s_k$. If so, each of the matrices L, U is a 2-diagonal matrix, of which the elements $L_{kk}$, where $k=1, \ldots, m$; $l_{k,k-q}$, wherein $k=q+1, \ldots, m$; $U_{kk}$, wherein $k=1, \ldots, m$; and $U_{k,k+q}$, wherein $k=1, \ldots, m-q$; have a value differing from O. On the basis thereof the elements $y_k$ of the m-vector y can be solved in accordance with $$y_k = \begin{cases} z_k, & k = 1, \ldots, q \\ z_k - L_{k,k-q} y_{k-q} & k = q+1, \ldots, q \end{cases} \quad (9)$$

and the elements of the m-vector $\hat{x}$ can be solved in accordance with $$\hat{x}_{m+1-k} = \quad (10)$$

$$\begin{cases} y_{m+1-k}/U_{m+1-k,m+1-k} & k = 1, \ldots, q \\ (y_{m+1-k} - U_{m+1-k,m+1-k+q}\hat{x}_{m+1-k+q}) = q+1, \ldots, \\ \hat{x}_m + 1 - k + q) \div \\ (U_{m+1-k,m+1-k}) \end{cases}$$

For those elements of the matrices L, U whose value differs from O the following relations apply:

$$\begin{aligned}
U_{kk} &= 1 + c^2, & k &= 1, \ldots, q \\
U_{kk} &= 1 + c^2 - c^2/U_{k-q,k-q} & k &= q+1, \ldots, m \\
U_{k,k+q} &= -c, & k &= 1, \ldots, m-q \\
L_{kk} &= 1 & k &= 1, \ldots, q \\
L_{k,k-q} &= -c/U_{k-q,k-q} & k &= q+1, \ldots, m
\end{aligned} \quad (11)$$

From the relations of formula (11) it is apparent that the elements $U_{kk}$ and $L_{k,k-q}$ remain constant over intervals given by q consecutive values of the index k, so that these elements can be designated by $$\begin{aligned}
U_{kk} &= U_{(k-1)\div q-1} & k &= 1, \ldots, m \\
L_{k,k=q} &= L_{(k-1)-q+1} k &= q+1, \ldots, m
\end{aligned}$$

wherein ÷ indicates that integer numbers are divided, the residual term being ignored. This implies that the number of different values of $u_k$ wherein $k=1, \ldots, (m-1) \div q+1$ is defined by $(m-1) \div q$ and the number of different values of $l_k$, wherein $k=2, \ldots, (m-1)/q+1$ is given by $(m-1)/q$. Using a system as described above, calculating the elements of the matrices L, U is an order of magnitude of 2m/q operations, 2m operations being required for the resubstitutions.

In a "fixed point" algorithm the simplification is permissible for utilizing the sequence $g'_k = g_k/g_0$, wherein $K = -q, \ldots, q$, as all the elements have a value in the range from $[-1, 1]$. Herein $g_k$ is defined by the formulae (4) and (5), it holding for $g_0$ that $g_0 = 1 + c^2$ wherein $|c| \leq 1$. Using such a simplification the matrix G can be replaced by a matrix (13) $G' = G/g_0 LU' = LU/g_0$ wherein L and U represent the matrices L and U defined in the foregoing. For the diagonal elements $U'_{kk}$ wherein $k = 1, \ldots, m$ of the matrix U' the following limits hold:

$$\begin{aligned}
1/2 &< 1/(1+c^2) \leq Y_{kk}' \leq 1, \\
k &= 1, \ldots, m
\end{aligned}$$

As is obvious from formula (10), the elements $U_{kk}$ or $U'_{kk}$, wherein $k = 1, \ldots, m$ must be considered to be dividers which in a "fixed point" implementation may cause inaccuracies at low values. In view of the circumstances that $U'_{kk}$ is limited between the values 1 and $\frac{1}{2}$, the maximum number of bits can be used for each divider $U'_{kk}$, wherein $K = 1, \ldots, m$. In addition it is found that all the elements of the matrices L and U' have a value within the range $[-1, 1]$, which implies that for a "fixed point" implementation no additional scaling is required.

A further simplification is obtained by considering the factor c to be a constant value $c = c_f$. It is found that a value $c_f$ of, for example, approximately 0.7 yields good results.

Starting from a chosen fixed value for the factor c the coefficient $u_k$ or $u'_k = u_k/g_0$, wherein $k = 1, \ldots, (m-1) \div q+1$ and $l_k$, wherein $k = 2, \ldots, (m-1) \div q+1$ can be calculated previously and the values thus calculated can be stored in a Table memory for a predetermined maximum value of $(m-1) \div q$. This ratio can, for example, be determined from $(m_{max}-1) \div q_{min}+1$. For speech sampled at a frequency of 8000 Hz it then holds that $99 \div 16$ is approximately equal to 6.

Solving the system of equations as defined by $G\hat{x} = z$ is then simplified to a back substitution procedure as proposed by the equations (9) and (10).

Because of the interaction of the central control unit 3.9 and the available memories 3.10, 3.11 and 3.12, this back-substitution procedure can effectively be implemented starting from the previously found data q, a and the elements $z_k$.

At the same time it was found within the scope of the present invention, that the techniques describes in the foregoing can be successfully used, also when non-voiced speech must be recovered. For non-voiced speech a certain periodicity is calculated and the estimation for the quantity q has an arbitrary value. This means that for non-voiced speech a noisy signal is substituted in the positions of invalid samples. A significant advantage of such an approach is that for a restoration procedure for speech it is not necessary to decide whether a speech signal segment to be restored relates to voiced or non-voiced speech.

The static memory 3.12 of the embodiment shown in FIG. 3 is programmed such that the algorithm for recovering a signal segment containing invalid samples can be implemented. As was described in detail in the foregoing such an implementation actually means an estimation of the quantity q determining the syndrome vector z and double back-substitution for the solution of the system of equations of the shape $G\hat{x} = z$. For the sake of completeness, it should be noted that, since a constant value was chosen for the quantity c, a 2-level correlator which is known per se can be used for estimating the quantity q to accelerate the procedure. Such a correlation is arranged for calculating the auto-correlation function of a sequence of the shape $$C(s_k) = \begin{cases} 1 & s_k > c_1 s_{max} \\ 0 & |s_k| < c_1 s_{max} \\ -1 & s_k > c_1 s_{max}, k = 0, \ldots, N-1 \end{cases}$$

wherein $s_{max}$ represents the maximum absolute value of $s_m$, wherein $k = 0, \ldots, N-1$. The value 0 is here filled-in for the values of the invalid samples $s_{r(1)}, \ldots, s_{r(m)}$. Such a correlator can be realised in a simple manner in the form of an up/down counter controlled by the result of the multiplication $C(s_k)C(s_{k+j})$.

The invention can be advantageously used for restoring time-discrete speech signals. Obviously the invention is also applicable to analog speech signals when these signals are first made discrete. The invention is also applicable to, for example, the restoration of speech signals which during transmission were protected by an error-correcting and error-detecting code. In such a situation those samples can be restored which can indeed be detected as an error, but which cannot be corrected anymore.

An embodiment of a sample-restoration system according to the invention is further illustrated by the flow-chart of FIG. 4. This flow-chart is illustrative of the program stored in the program store 3.12 in FIG. 3 controlling inputting and outputting of data. The program can be described as follows:

block 4.1 caption: "wait for interrupt", description: data can be inputted and outputted during an interrupt, that is to say when a clock pulse from data clock 3.15 appears.

block 4.2 caption: "output/input", description: at the appearance of a clock pulse the value of a new sample is inputted via input 3.6 and written in the memory 3.10 at the first free address and the oldest sample in the memory 3.10 is read and outputted.

block 4.3, caption: "input/error?", description: when entering a new sample, also the error flag is entered via input 3.7. If no invalid sample is detected, then the subsequent clock pulse is awaited for repeating the procedure.

block 4.4 caption: "update error table", description: if a sample is detected as being invalid, the address of the sample in the memory 3.10 is entered into a table of invalid samples in the working store 3.11.

Acting thus, the cyclic buffer memory 3.10 operates as a delay line, the delay being determined by the period of time necessary for one restoration cycle, measured from the instant at which the first invalid sample was inputted up to an including the correction of the last invalid sample. The program, stored in the memory 3.12, with which the replacement values of the invalid samples are calculated, is started when the input/output program detects an invalid sample.

The restoration program will be described in detail with reference to FIG. 5, which shows a flow chart which is illustrative of this program.

block 5.1, caption: "wait for invalid samples", description: as long as no pattern of invalid samples is detected, the restoration program is at a stand-still.

block 5.2, caption: "set invalid sample values to zero; compute q and a", description: given the periodicity of the signal segment whose estimation is proposed by the samples in this interval, auto-correlation coefficients $r_k$ are computed, which are defined by equation (8) above, repeated here for convenience as follows:

$$r_k = \frac{1}{N} \sum_{l=0}^{N-k} s_l s_{l+k}, k = 0, \ldots, 160 \quad (8)$$

Computing the products $S_l S_{l+k}$ can be effected in a fast manner by reducing, in accordance with formula (15), the quantization degree of the samples. The constant scaling factor a is calculated from $$a = -\frac{c}{1 + c^2}$$

wherein c is a constant value, for example 0.68.

block 5.3, caption: "compute G". This signifies the formation of a m×m Toeplitz matrix, whose elements are given by equation (7) above, repeated here for convenience as follows:

$$G_{kl} = \begin{cases} 1, k = l & k, l = 1, \ldots, m \\ a, |t(k) - t(l)| = q & k, l = 1, \ldots, m \\ 0, \text{elsewhere} & k, l = 1, \ldots, m \end{cases} \quad (7)$$

block 5.4, caption "compute syndrome". Herein the components $z_k$ of the m-vector z are computed, these components being given by equation (6) above, repeated here for convenience as follows: (6) $Z_k = -a(s_{t(k)-q} + s_{t(k)+q})$, k=1, ..., m Then, samples which are located q samples before and after the relevant invalid sample $S_t(k)$ are added together after scaling.

block 5.5, caption: "compute replacing samples". Description: the replacement values of the invalid samples $s_{t(1)}, \ldots, s_{t(m)}$ are computed by solving the system $G\hat{x} = z$. This system is solved using a program for solving a system of m equations with m unknowns in accordance with the above-described LU-decomposition method.

block 5.6, the values of the invalid samples which were set to zero in the memory 10, are now replaced by the estimated value $\hat{s}_{t(i)}, \ldots, \hat{s}_{t(m)}$. Thereafter the program is again cycled through.

Appendix $$g_k = \frac{1}{2\pi} \int_{-\pi}^{\pi} \frac{1}{S(\theta)} e^{j\theta k} \cdot d\theta \cdot \text{met } k = -\infty, \ldots, \infty \quad (1)$$

$$z_k = -\sum_{l=-\infty}^{\infty} g\{(t(k)-l)\} \cdot s_l, \text{met } k = 1, \ldots, m \quad (2)$$
met $l \neq t(1), \ldots, t(m)$ $$G_{kl} = g_{t(k)-t(l)}, \text{met } k,l = 1, \ldots, m \quad (3)$$

$$g_k = \begin{cases} 0, & |k| > p \\ \sum_{l=0}^{p-|k|} a_l a_{l+|k|}, & |k| \leq p \end{cases} \quad (4)$$

$$g_k = \begin{cases} 1, & k = 0 \\ a = -\frac{c}{1+c^2}, & k = p = q \\ 0, & k \neq 0, k \neq q \end{cases} \quad (5)$$

-continued $$Z_k = -a(s_{r(k)-q} + s_{r(k)-q}), \quad k = 1, \ldots, m \tag{6}$$

$$G_{kl} = \begin{cases} 1, & k = l & k, l = 1, \ldots, m \\ a, & |r(k) - r(l)| = q & k, l = 1, \ldots, m \\ 0, & \text{elders} & k, l = 1, \ldots, m \end{cases} \tag{7}$$

$$r_k = \frac{1}{N} \sum_{l=0}^{n-k} s_{l} s_{l+k}, \quad k = 0, \ldots, 160 \tag{8}$$

$$Y_k = \begin{cases} Z_k, & k = 1, \ldots, q \\ Z_k - L_{k,k-q} y_{k-q}, & k = q+1, \ldots, m \end{cases} \tag{9}$$

$$\hat{x}_{m+1-l} = \begin{cases} y_{m+-k}/U_{m+1-k,m+1-k}, & k = 1, \ldots, q \\ (y_{m+1-k} - U_{m+1-k,m+1-k+q} \cdot \hat{x}_{m+1-k+q})/U_{m+1-k,m+1-k}, & k = q+1, \ldots, m \end{cases} \tag{10}$$

$$U_{kk} = 1 + c^2, \qquad k = 1, \ldots, q$$

$$U_{kk} = 1 + c^2 - c^2/U_{k-q,k-q}, \quad k = q+1, \ldots, m$$

$$U_{k,k-q} = -c, \qquad k = 1, \ldots, m-q$$

$$L_{kk} = 1, \qquad k = 1, \ldots, q$$

$$L_{k,k-q} = -c/U_{k-q,k-q}, \quad k = q+1, \ldots, m$$

$$\begin{aligned} U_{kk} &= U_{(k-1)\div q+1}, k = 1, \ldots, m \\ L_{k,k} &= q \end{aligned} \quad l_{(k-1)\div q+1} \, k = q+1, \ldots, m \tag{12}$$

$$G' = G/g_0 = LU' = LU/g_0 \tag{13}$$

$$\tfrac{1}{2} > 1/(1 + c^2) \le U_{kk}' \le 1, \quad k = 1, \ldots, m \tag{14}$$

$$C(s_k) = \begin{cases} 1 & s_k > c_1 s_{max} \\ 0 & |s_k| > c_1 s_{max} \\ -1 & s_k > c_1 s_{max}, \quad k = 0, \ldots, N-1 \end{cases} \tag{15}$$

What is claimed is:

1. A method of replacing a subsequence of a number m of consecutive invalid samples $s_{r(i)}$ of an equidistantly sampled received signal, wherein $i = 1, \ldots, m$, with valid samples of such signal occurring during a segment thereof which includes said subsequence of invalid samples, said method comprising:

storing a sequence of N consecutive samples $s_k$, wherein $k = 0, 1, \ldots, N-1$, of said segment of said received signal which includes said subsequence of invalid samples $s_{r(i)}$, said number N including a number of valid samples of said received signal corresponding to a predetermined maximum anticipated periodicity of such signal during said segment thereof;

determining from said stored sequence of N samples $s_k$ a quantity q representing a number of such samples corresponding to the periodicity of said received signal during said segment thereof;

determining a vector z for said subsequence of invalid samples $s_{r(i)}$ by adding together pairwise, after scaling by a constant scaling coefficient "a", a number qn of said stored samples $s_k$ located before and an equal number qn of said stored samples $s_k$ located after each of said invalid samples $s_{r(i)}$, n being an integer such that qn corresponds to said maximum anticipated periodicity;

forming a system of autoregression equations with a number of unknown quantities equal to said number m of invalid samples $s_{r(i)}$, such equations being of the form $G\hat{x} = z$, wherein G is an $(m \times m)$ matrix and $\hat{x}$ is an m-vector containing elements $\hat{x}_i$, an element $\hat{x}_i$ being an estimated corrected value of an invalid signal samples $s_{r(i)}$;

solving said system of equations $G\hat{x} = z$ to derive the m values of $\hat{x}_i$; and providing m signal samples having said corrected values $\hat{x}_i$ to replace the m invalid signal samples $s_{r(i)}$.

2. A method as claimed in claim 1, in which the sampling rate of said received signal is $f_s$ and said number N of stored consecutive samples $s_k$ is $$N = 2 f_s/f_{min} + m,$$

wherein $f_{min}$ is a frequency corresponding to said maximum anticipated periodicity of said signal segment.

3. A method as claimed in claim 1, further comprising:

determining whether the number m of invalid samples exceeds or is less than the quantity $q + 1$;

if $m \le q$, setting the vector $\hat{x}$ equal to the vector z;

if $m \ge q + 1$, converting the matrix G into a product LU by means of LU-decomposition, wherein L and U respectively represent a lower triangular matrix and an upper triangular matrix of $(m \times m)$ elements, the elements $L_{kk}$ and $U_{kk}$ thereof which differ from zero being given by $$U_{kk} = 1 + c^2, \quad k = 1, \ldots, q$$
$$U_{kk} = 1 + c^2 - c^2/U_{k-q,k-q} \quad k = q+1, \ldots, m$$
$$U_{k,k+q} = -c, \quad k = 1, \ldots, m-q$$
$$L_{kk} = 1 \quad k = 1, \ldots, q$$
$$L_{k,k-q} = -c/U_{k-q,k-q}; \quad k = q+1, \ldots, m$$

solving the system of equations $Ly=z$ to derive y; and solving the system of equations $U\hat{x}=y$ to derive $\hat{x}$.

4. Apparatus for providing correct samples to replace invalid samples of an equidistantly sampled received signal, each invalid sample being identified by a flag bit in said received signal, correct samples being derived from a segment of said received signal which includes said invalid samples, such apparatus comprising:

detection means responsive to a sequence of consecutive flag bits in said received signal to produce a flag signal identifying the corresponding sequence of consecutive invalid samples in said received signal;

control means and a memory coupled to said detection means, said control means being responsive to said flag signal to store in said memory a sequence of N consecutive samples $s_k$ of a segment of said received signal which includes as a subsequence therein said sequence of consecutive invalid samples $s_{t(i)}$ to be replaced, wherein $k=0, 1, \ldots, N-1$, and $i=1, \ldots, m$, said number N including a number of valid samples of said received signal corresponding to a predetermined maximum anticipated periodicity of such signal during said segment thereof; and computing means coupled to said memory and programmed so as to
 (a) determine from said stored sequence of samples $s_k$ a quantity q representing a number of such samples corresponding to the periodicity of said received signal during said segment thereof;
 (b) determine a vector z for said subsequence of invalid samples $s_{t(i)}$, such determination being made by adding together pairwise, after scaling by a constant scaling coefficient "a", a number qn of said stored samples $s_k$ located before and an equal number qn of said stored samples $s_k$ located after each of said invalid samples $s_{t(i)}$, n being an integer such that qn corresponds to said maximum anticipated periodicity;
 (c) form a system of autoregression equations with a number of unknown quantities equal to said number of m of invalid samples $s_{t(i)}$, such equations being of the form $G\hat{x}=z$, wherein G is an (m×m) matrix and $\hat{x}$ is an m-vector containing elements $\hat{x}_i$, an element $\hat{x}_i$ being an estimated corrected value of an invalid signal samples $s_{t(i)}$;
 (d) solve said system of equations $G\hat{x}=z$ to derive the m values of $\hat{x}_i$, and
 (e) provide m output signal samples having said corrected values $\hat{x}_i$ as replacements for the m invalid signal samples $s_{t(i)}$.

5. Apparatus as claimed in claim 4, further comprising comparator means for comparing the values of m and q and supplying a command signal to said computing means when $m \geq q+1$, and said computing means is further programmed so that in response to said command signal it:
 (f) converts said matrix G into a product LU by means of LU-decomposition, wherein L and U respectively represent a lower triangular matrix and an upper triangular matrix of (m×m) elements, the elements $L_{kk}$ and $U_{kk}$ thereof which differ from zero being given by $$U_{kk} = 1 + c^2, \quad k = 1, \ldots, q$$
$$U_{kk} = 1 + c^2 - c^2/U_{k-q,k-q} \quad k = q+1, \ldots, m$$
$$U_{k,k+q} = -c, \quad k = 1, \ldots, m-q$$
$$L_{kk} = 1 \quad k = 1, \ldots, q$$
$$L_{k,k-q} = -c/Q_{k-q,k-q}; \quad k = q+1, \ldots, m$$

c being a predetermined constant periodicity coefficient; and
 (g) solves a system of equations $Ly=z$ to derive y, and solves a system of equation $U\hat{x}=y$ to derive $\hat{x}$.

6. Apparatus as claimed in claim 5, wherein said computing means further comprises a further memory for storing a table of predetermined values of the elements of said L-matrix and said U-matrix of said product LU.

* * * * *